United States Patent [19]

Rice et al.

[11] Patent Number: 5,520,081
[45] Date of Patent: May 28, 1996

[54] MULTIPLE POSITION BLADE HOLDER FOR SCROLL SAW

[75] Inventors: Kristen L. Rice, Harrisonville; Richard Keener, Garden City, both of Mo.

[73] Assignee: R. B. Industries, Inc., Harrisonville, Mo.

[21] Appl. No.: 199,994

[22] Filed: Feb. 18, 1994

[51] Int. Cl.$^6$ .................................................. B27B 19/10
[52] U.S. Cl. ........................... 83/781; 83/783; 83/699.21
[58] Field of Search ............................... 83/699.21, 783, 83/781, 786

[56] References Cited

U.S. PATENT DOCUMENTS

| | | | |
|---|---|---|---|
| 4,807,507 | 2/1989 | Rice et al. | 83/699.21 |
| 4,825,741 | 5/1989 | Wellington et al. | 83/781 |
| 4,838,138 | 6/1989 | Rice et al. | 83/699.21 |
| 4,953,431 | 9/1990 | Chen | 83/781 |
| 5,105,704 | 4/1992 | Chang | 83/699.21 |
| 5,351,591 | 10/1994 | Miyamoto et al. | 83/781 |

FOREIGN PATENT DOCUMENTS

| | | | |
|---|---|---|---|
| 186845 | 11/1955 | Austria | 83/783 |
| 79592 | 8/1950 | Czechoslovakia | 83/783 |
| 478503 | 6/1929 | Germany | 83/783 |
| 2118450 | 5/1979 | Germany | 83/783 |

*Primary Examiner*—Kenneth E. Peterson
*Attorney, Agent, or Firm*—Shook, Hardy & Bacon

[57] ABSTRACT

A multiple position blade holding apparatus for a parallel arm scroll saw having a connection for varying the angle of the blade relative to the work surface achieves an optimum cutting action for the thickness of the material being cut. The blade holder may be strategically angled to avoid bowing of the blade or to keep a work piece from lifting up as it is cut.

9 Claims, 2 Drawing Sheets

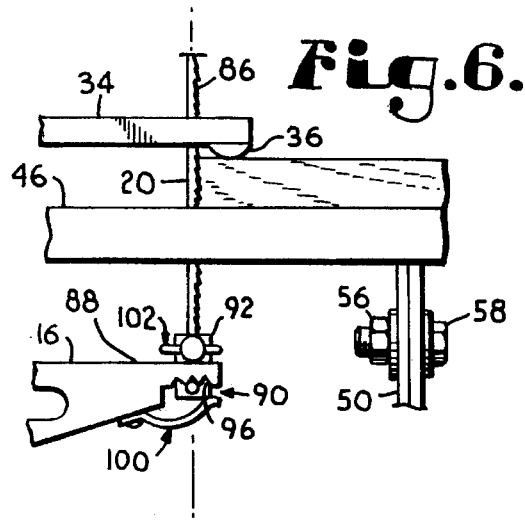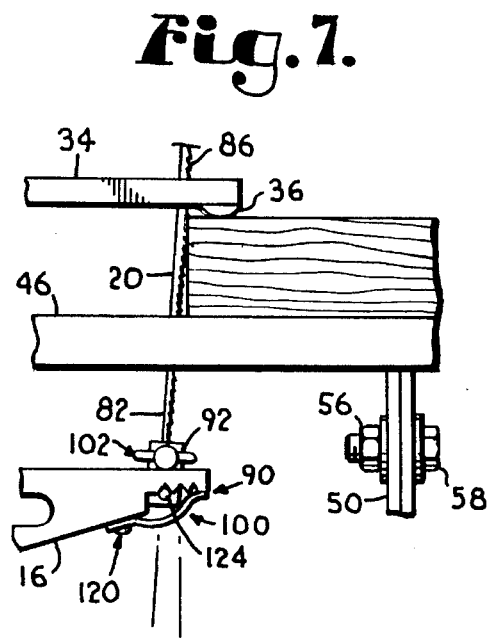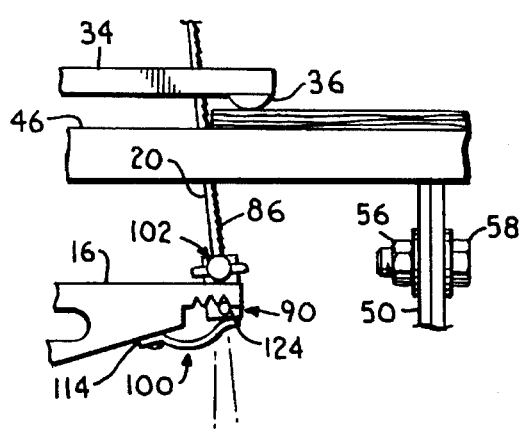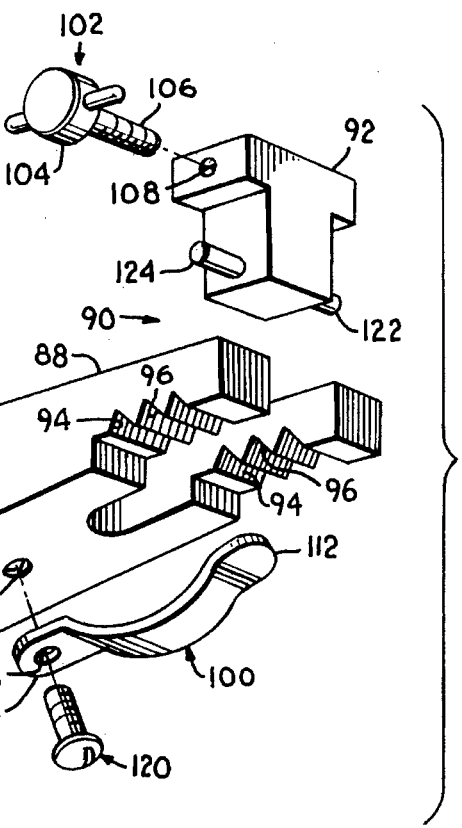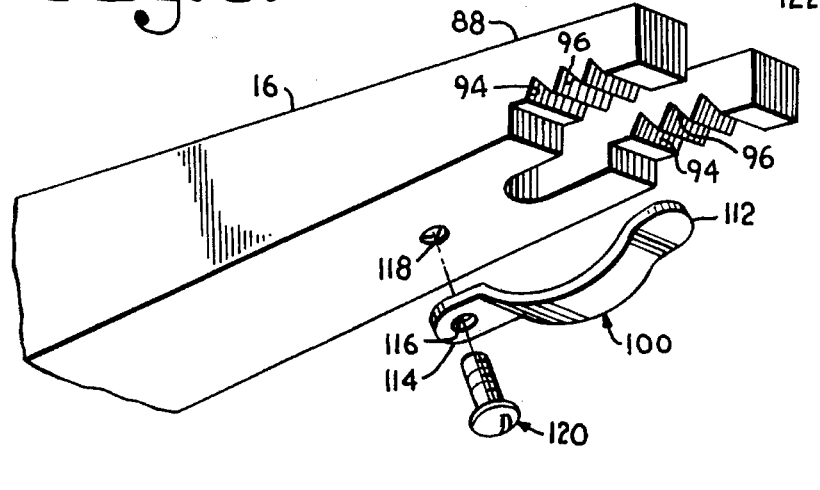

MULTIPLE POSITION BLADE HOLDER FOR SCROLL SAW

BACKGROUND OF THE INVENTION

This invention relates in general to a blade holder for a parallel arm scroll saw and, more particularly, to a multiple position blade holder for varying the angle of the blade relative to a work surface to achieve an optimum cutting action for the thickness of the material being cut.

Scroll saws are commonly used by both craftsmen and amateurs for fine wood work. Parallel arms hold the blade in place and reciprocate in unison to accomplish a precise cutting action. Existing scroll saws hold the saw blade in a single position or angle with respect to the work surface. Typically, a scroll saw having a single position blade holder holds the saw blade substantially vertical relative to a work piece resting on a substantially horizontal work surface. Consequently, each work piece is cut by a saw blade that is substantially perpendicular to it.

However, it has been discovered that a substantially perpendicular cut is not desirable for every work piece. A problem sometimes encountered with scroll saws is that the saw blade will bow when attempting to cut relatively thick materials, that is, materials with a thickness of one inch or more. Another problem arises in cutting very thin materials, which have a tendency to lift up off the cutting surface when making contact with the blade. Typically, this lifting problem occurs when a conventional scroll saw is utilized to cut materials with a thickness of one-quarter of an inch or less.

SUMMARY OF THE INVENTION

The present invention overcomes the problems and limitations described above by providing a blade holder adapted to vary the angle of the saw blade relative to the work surface by placing it in one of a plurality of positions. The multiple position blade holder allows for strategic selection of the angle at which the blade will cut the work piece. For relatively thin materials, the saw blade is positioned at a first angle that causes it to initiate contact with the bottom edge of the work piece. For relatively thick materials, the saw blade is positioned at a second angle that causes it to initiate contact with the top edge of the work piece.

Accordingly, it is an object of the present invention to provide means for varying the angle of the saw blade relative to the work surface so that the blade achieves an optimum cutting action for the relative thickness of the material being cut.

Another object of the present invention is to provide a blade holder for a parallel arm scroll saw so that the saw blade is strategically angled to reduce bowing of the blade.

Yet another object of the present invention is to provide a blade holder for a parallel arm scroll saw so that the saw blade is strategically angled to keep the work piece from lifting up.

Still another object of the present invention is to provide a multiple position blade holder that may be coupled with existing parallel arm scroll saws so that an existing scroll saw can be retrofitted with the blade holder of the present invention without replacing the entire scroll saw.

A further object of the present invention is to provide an improved method for using a scroll saw to cut materials of varying thickness.

These and other objects of the present invention will become readily apparent upon further review of the following specification and drawings, To accomplish these and other objects of the present invention, a multiple position blade holder apparatus for a parallel arm saw is provided, the apparatus comprising means for varying the angle of the blade relative to the work surface to achieve an optimum cutting action for the thickness of the material being cut.

BRIEF DESCRIPTION OF THE DRAWINGS

In the accompanying drawings which form a part of the specification and are to be read in conjunction therewith and in which like reference numerals are used to indicate like parts in the various views:

FIG. 6 is a fragmentary side elevational view of the present invention with the blade substantially perpendicular to the work piece;

FIG. 7 is a fragmentary side elevational view of the present invention with the blade impacting the upper edge of a relatively thick work piece;

FIG. 8 is a fragmentary side elevational view of the present invention with the blade impacting the lower edge of a relatively thin work piece; and FIG. 9 is an exploded enlarged fragmentary perspective view of the blade holding apparatus of the present invention.

DETAILED DESCRIPTION OF THE INVENTION

Figure 1:
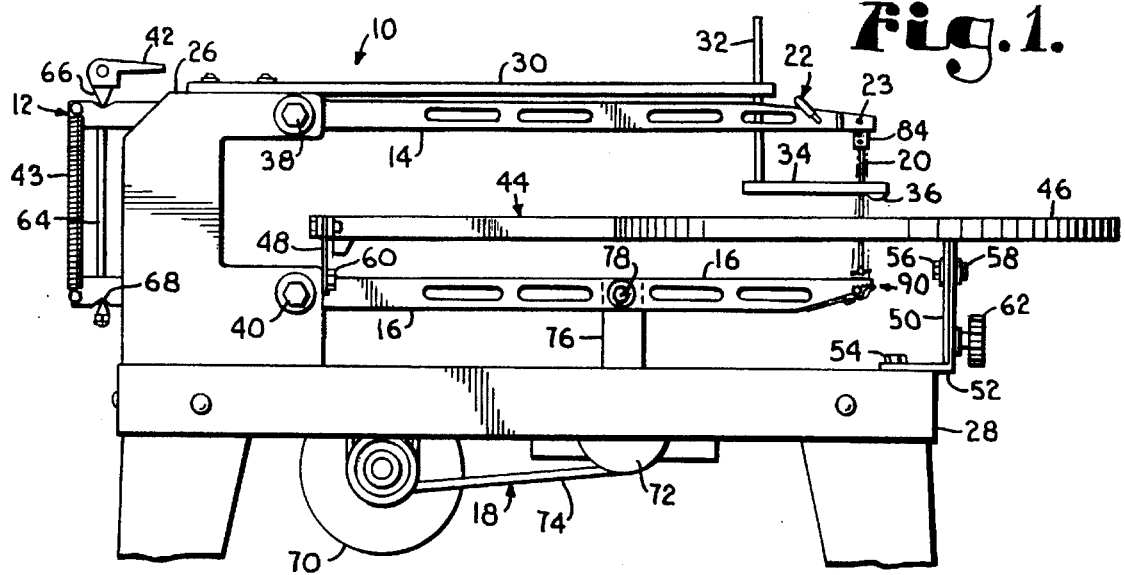
FIG. 1 is a side elevational view of a scroll saw having a blade holding apparatus in accordance with the present invention.

Referring to the drawings in greater detail, a scroll saw 10 having a blade holding apparatus in accordance with the present invention is illustrated in FIG. 1 and includes a rear blade tensioning mechanism 12, an upper arm 14 and a lower arm 16, a power assembly 18, a saw blade 20, and a camming mechanism 22.

Scroll saw 10 includes a pair of C-shaped mounting members 26 (one of which is visible in FIG. 1) supported in an upright position by a framework 28. One of the mounting members 26 supports a forwardly extending arm 30 which is attached to a vertical rod 32 and remotely coupled to a foot 34 having a nub 36 for holding a work piece in place during operation of the saw. Mounting members 26 and framework 28 support an apertured table 44 in a generally transverse, forwardly extending horizontal position. Arms 14 and 16 are pivotally coupled between mounting members 26 by an upper bolt 38 and a lower bolt 40. Those skilled in the art will appreciate that a single mounting member of unitary construction may be employed in other embodiments.

The tension of blade 20 is controlled by rear tensioning mechanism 12 which includes a tensioning rod 64 extending between the back ends of arms 14 and 16. The opposite ends of rod 64 are received by wedge-shaped blocks 66 and 68 which act in grooves formed in upper arm 14 and lower arm 16, respectively. A cam 42 acts against the upper block 66 in a manner to adjust the blade tension as the cam is turned. A tension spring 43 is connected between the back ends of arms 14 and 16.

Camming mechanism 22 includes a pivot pin 23 located at the forwardmost end of arm 14. Upper blade holder 84 extends downwardly from pivot pin 23 and is coupled with a second complemental blade holder element (not shown) by a compression pin 24, shown in FIG. 2. An Allen or other such adjustable screw 25 is provided to join the two upper blade holder elements into tight engagement. The details of the camming mechanism and other parts of the saw are set forth more fully in U.S. Pat. No. 5,088,369 entitled "Blade Tensioning Device For Scroll Saw", which is incorporated herein by reference.

Table 44 further includes a working surface 46 for supporting a work piece, a downwardly extending rear mounting bracket 48, and a front mounting flange 50. The forwardmost portion of framework 28 includes an upwardly extending front bracket 52 coupled to the framework by bolt 54. Front bracket 52 is coupled with a flange 50 by a nut 56 and a bolt 58. A rear bracket 48 is coupled with the forwardly extending lower leg portion of mounting members 26 by screws 60. Front bracket 52 is equipped with a knob 62 to permit pivotal adjustment of table 44 to vary the angle of working surface 46.

Power assembly 18 is mounted generally below framework 28 and includes a motor 70, a forwardly mounted pulley assembly 72 and an endless drive belt 74. A drive linkage 76 extends upwardly from pulley assembly 72 and is pivotally coupled with lower arm 16 by a bolt 78. In the preferred embodiment, motor 70 is a conventional electric shop motor. However, any suitable power source may be employed in other embodiments.

Figure 2:
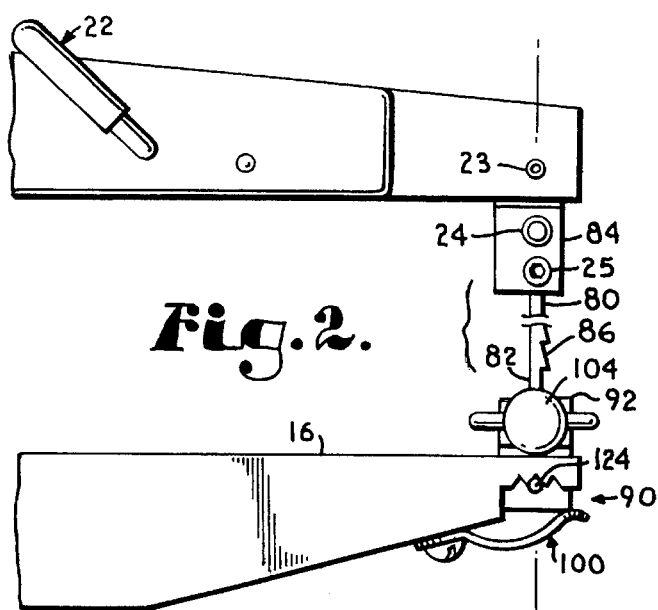
FIG. 2 is an enlarged fragmentary side elevational view of the blade holding apparatus secured in a substantially vertical position.

Saw blade 20 includes a cutting edge 86, an upper blade end 80 and a lower blade end 82 and is supported between upper and lower arms 14 and 16 at any one of a plurality of positions. In FIGS. 2 and 6, blade 20 is shown coupled to arm 16 in its upright or generally vertical position. By contrast, blade 20 is coupled to arm 16 in its rearmost nonvertical position in FIGS. 4 and 7, and in its forwardmost nonvertical position in FIGS. 3 and 8. FIGS. 6, 7, and 8 depict blade 20 cutting work pieces which vary in thickness and which are held flush against working surface 46 by nub 36 located at the forwardmost end of the underside of foot 34.

As shown in FIGS. 1 and 2, upper blade end 80 is coupled to upper arm 14 by upper blade holder 84. Further, lower blade end 82 is coupled to lower arm 16 by lower blade holder 90. However, those skilled in the art can appreciate that blade holder 90 is easily adapted for coupling upper blade end 80 to upper arm 14, and blade holder 84 is easily adapted for coupling lower blade end 82 to lower arm 16.

Referring next to FIG. 9, lower blade holder 90 comprises a T-shaped block 92, a fastener such as a thumbscrew 102, a support 100 and lower arm 16. Block 92 has an opening 108 for receiving thumbscrew 102. Thumbscrew 102 includes a head 104 and a stem 106. Stem 106 may be threaded or otherwise adapted for engaging opening 108. The lower blade end 82 enters block 92 through an opening 110 (shown in FIG. 5) and rests inside block 92. Arched support 100 includes flanged ends 112 and 114. Flanged end 114 has an opening 116 corresponding to an aperture 118 on the underside of arm 16 for receiving a fastener such as screw 120. Screw 120 may be threaded or otherwise adapted for engaging opening 116 and aperture 118.

Block 92 has a pair of lower arms 122 and 124 which may be received by notches provided on the underside of a forked end 88 of lower arm 16. Rearmost notch 94, middle notch 96, and forwardmost notch 98 present different positions in which blade 20 may be coupled to arm 16. As illustrated in FIG. 9, each notch is comprised of two corresponding notch sections separated by an open space. Thus, arm 122 is received in one section of notch 96 and arm 124 is received in the corresponding section of notch 96 when block 92 is situated in notch 96.

In FIG. 2, block 92 is secured in notch 96, so blade 20 is coupled to arm 16 in its upright position. Blade 20 is shown in nonvertical positions in both FIGS. 3 and 4 since block 92 is positioned in notches 98 and 94, respectively.

Figure 5:
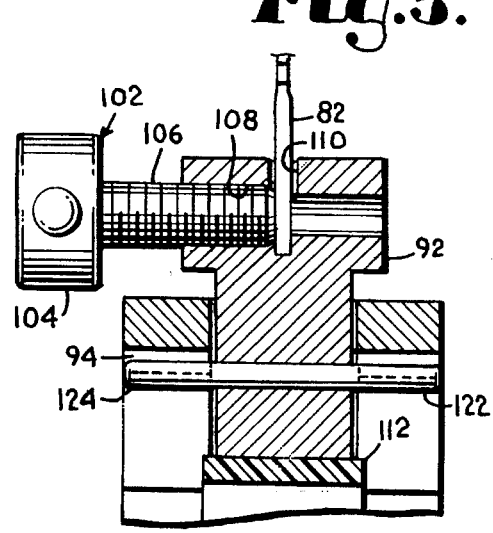
FIG. 5 is an enlarged sectional view of the blade holding apparatus of the present invention taken along line 5—5 of FIG. 3.

In FIG. 5, lower blade end 82 is received by block 92 through blade opening 110. Then, thumbscrew 102 engages aperture 108 until the end of stem 106 firmly contacts blade end 82 so as to secure it in place and limit its lateral movement. Blade end 82 may be coupled to block 92 and thumbscrew 102 either before or after block 92 is secured in a given position.

In the preferred embodiment, scroll saw 10 and, more specifically, arms 14 and 16, saw blade 20, camming mechanism 22, mounting members 26, and framework 28 are constructed of corrosion-resistant metals. However, supporting framework 28 may also be constructed of wood, fiberglass, or synthetic resin material.

In operation, motor 70 drives belt 74, causing pulley assembly 72 to rotate and reciprocate drive linkage 76 in a generally up-and-down motion. Linkage 76 in turn reciprocates arms 14 and 16 in similar motion about bolts 38 and 40. Rod 64 transfers the motion of lower arm 16 to upper arm 14, causing it to reciprocate in parallel motion about bolt 38 when saw blade 20 is in place. Blade 20, which is supported between arms 14 and 16 to extend through apertured table 44, reciprocates in like up-and-down manner. A work piece is supported on work surface 46 for movement into cutting contact with blade 20. Foot 34 is adjusted downwardly so that nub 36 rests on the work piece to hold it in place during the sawing operation. Thus, reciprocating blade 20 intersects the plane of the work surface 46 at a substantially ninety degree angle.

Technically, the plane of reciprocation of the saw blade 20 intersects the aperture (not shown) in planar work surface 46 rather than intersecting the work surface itself. For the purposes of the present invention, however, this intersection is suitably described in the specification and in the claims as the intersection of the plane of reciprocation of the blade 20 and the plane of work surface 46.

Figure 3:
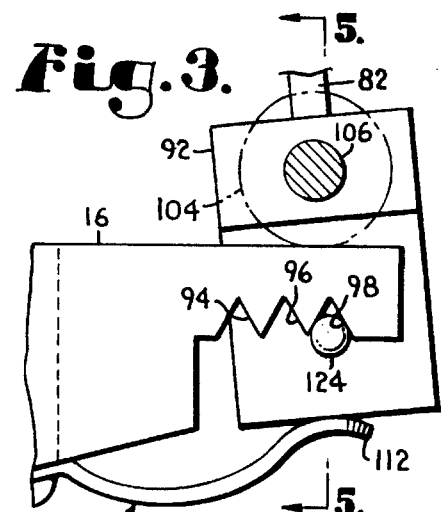
FIG. 3 is an enlarged partial side elevational view of the blade holding apparatus secured in a nonvertical position.
Figure 4:
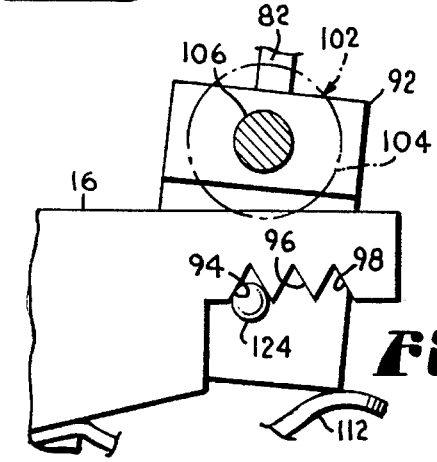
FIG. 4 is an enlarged partial side elevational view of the blade holding apparatus shown in a different nonvertical position.

FIGS. 2, 3, and 4 further illustrate the manner in which blade 20 is coupled to arm 16. The forwardmost end 88 of arm 16 is suitably adapted to receive arms 122 and 124 of T-shaped block 92 in a plurality of positions. Accordingly, forked end 88 of arm 16 presents a plurality of notches such that each pair of corresponding notch sections defines a different position for coupling block 92 with arm 16. More specifically, when lower arms 122 and 124 are situated in rearmost notch 94, as shown in FIG. 4, blade holder 90 is in a first nonvertical position. Similarly, blade holder 90 may be placed in a substantially vertical position or a second nonvertical position by placing arms 122 and 124 in central notch 96 or forwardmost notch 98 as shown in FIGS. 2 and 3, respectively.

Support 100, which is removably attached to lower arm 16 by screw 120, braces block 92 so that arms 122 and 124 remain in the desired position. Typically, end 112 of support 100 will contact the bottom of block 92.

As shown in FIGS. 6, 7, and 8, the angle at which saw blade 20 intersects planar work surface 46 varies depending on the position of block 92. In FIG. 6, blade holder 90 is located in its middle or upright position, and consequently blade 20 makes a substantially perpendicular cut to the leading edge of the work piece as arms 14 and 16 reciprocate up and down.

For the purpose of identifying the angle of intersection between work surface 46 and the plane of reciprocation of blade 20, a nonperpendicular angle is acute if the angle between the cutting edge 86 of blade 20 and the portion of work surface 46 below the work piece measures between zero and ninety degrees. Conversely, an angle is obtuse if the angle between the cutting edge 86 of blade 20 and the portion of work surface 46 below the work piece measures between ninety and one hundred eighty degrees. Of course, an angle is substantially perpendicular if the angle between blade 20 and work surface 46 is substantially ninety degrees.

The effect of placing blade holder 90 in either rearmost notch 94 or forwardmost notch 98 is to dispose blade 20 at an oblique or nonperpendicular angle with respect to work surface 46. In FIG. 7, blade holder 90 is positioned in rearmost notch 94, thereby causing blade 20 to initiate the cutting action at the top edge of the work piece as arms 14 and 16 reciprocate up and down. Moreover, the angle at which the plane of reciprocation of blade 20 intersects the plane of work surface 46 is an acute angle when blade holder 90 is situated in notch 94. Such an angle reduces bowing of the blade which is commonly encountered when attempting to make a substantially perpendicular cut to a relatively thick work piece.

On the other hand, when blade holder 90 is positioned in forwardmost notch 98, as in FIG. 8, blade 20 initiates the cutting action at the bottom edge of the work piece as arms 14 and 16 reciprocate up and down. Accordingly, the angle at which the plane of reciprocation of blade 20 intersects the plane of work surface 46 is an obtuse angle when blade holder 90 is in notch 98. By disposing the blade at such an angle, an improved cutting action is achieved with relatively thin materials because the work piece does not tend to lift up.

As can be seen in FIG. 5, blade 20 may be replaced by loosening thumbscrew 102 and removing lower blade end 82 from blade opening 110. Then, a new blade may be installed by inserting the lower blade end into opening 110 and tightening thumbscrew 102.

From the foregoing, it will be seen that this invention is one well adapted to attain all the ends and objects hereinabove set forth together with other advantages which are obvious and inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matters herein set forth or shown in the accompanying drawings is to be interpreted as illustrative and not in a limiting sense.

Having thus described the invention, we claim:

1. A blade positioning apparatus for holding the saw blade of a parallel arm saw at an angle relative to a planar work surface, said apparatus comprising:

means adapted to be coupled with the blade for varying the angle of the blade relative to the work surface to achieve an optimum cutting action for the thickness of the material being cut;

said varying means including means for coupling said blade with one arm of said parallel arm saw, support means for bracing said blade against said one arm, and a plurality of notches in said one arm; and pivot means for coupling said blade with the other arm of said parallel arm saw.

2. The apparatus of claim 1, wherein said varying means is adapted to place said blade in an upright position, whereby the angle at which the saw blade intersects the plane of the work surface is substantially perpendicular.

3. The apparatus of claim 2, wherein said blade has a cutting edge and said varying means is adapted to place said blade in a first nonvertical position, whereby the angle between the cutting edge and the work surface is acute.

4. The apparatus of claim 1, further comprising means for reciprocating the saw blade to intersect the plane of the work surface.

5. An apparatus for cutting materials of varying thickness by holding a saw blade at an angle relative to a planar work surface, said apparatus comprising:

a scroll saw having a pair of parallel arms and a planar work surface;

a pair of blade holders for coupling the blade to each of the parallel arms;

means for reciprocating the blade to intersect the plane of the work surface;

means adapted to be coupled with the blade for varying the angle of the blade relative to the work surface to achieve an optimum cutting action for the thickness of the material being cut;

said varying means including means for coupling said blade with one arm of said parallel arm saw and a plurality of notches in said one arm;

wherein said varying means is adapted to dispose the blade in an oblique position with respect to the work surface such that the blade will impact the bottom edge of a relatively thin material and said varying means is adapted to dispose the blade in an oblique position with respect to the work surface such that the blade will impact the top edge of a relatively thick material; and pivot means for coupling said blade with the other arm of said parallel arm saw.

6. A blade positioning apparatus for holding the saw blade of a parallel arm saw at an angle relative to a planar work surface, said apparatus comprising:

means adapted to be coupled with the blade for varying the angle of the blade relative to the work surface to achieve an optimum cutting action for the thickness of the material being cut;

wherein said varying means is adapted to place said blade in an upright position, whereby the angle at which the saw blade intersects the plane of the work surface is substantially perpendicular;

wherein said blade has a cutting edge and said varying means is adapted to place said blade in a first nonvertical position, whereby the angle between the cutting edge and the work surface is acute, and said varying means is adapted to place said blade in a second nonvertical position, whereby the angle between the cutting edge and the work surface is obtuse;

said varying means including means for coupling said blade with one arm of said parallel arm saw, support means for bracing said blade against said one arm, and a plurality of notches in said one arm; and pivot means for coupling said blade with the other arm of said parallel arm saw.

7. The apparatus of claims 1 or 6, wherein said varying means further comprises means for defining a first opening to receive said blade.

8. The apparatus of claim 7, wherein said varying means further comprises means for defining a second opening to receive a fastener securing said blade within said blade holder and limiting lateral movement of said blade.

9. The apparatus of claim 6, further comprising means for reciprocating the saw blade to intersect the plane of the work surface.

\* \* \* \* \*